United States Patent [19] [11] 3,735,356
Yates [45] May 22, 1973

[54] DATA PROCESSING ARRANGEMENTS HAVING CONVERTIBLE MAJORITY DECISION VOTING

[75] Inventor: Michael Harold John Yates, Writtle, England

[73] Assignee: The Marconi Company Limited, Chelmsford, Essex, England

[22] Filed: Sept. 13, 1971

[21] Appl. No.: 179,764

[30] Foreign Application Priority Data

Sept. 25, 1970 Great Britain....................45,796/70

[52] U.S. Cl.................................340/172.5, 235/153
[51] Int. Cl................................................G06f 11/00
[58] Field of Search..................340/172.5, 146.1 BE; 235/153; 307/211, 215

[56] References Cited

UNITED STATES PATENTS

| | | | |
|---|---|---|---|
| 3,356,837 | 12/1967 | Raymond | 340/172.5 X |
| 3,226,569 | 12/1965 | James | 235/153 X |
| 3,428,824 | 2/1969 | Linardos | 307/215 |
| 3,460,094 | 8/1969 | Pryor | 340/172.5 |
| 3,491,302 | 1/1970 | Madsen | 307/215 X |
| 3,501,743 | 3/1970 | Dryden | 340/146.1 BE |
| 3,538,498 | 11/1970 | Games | 340/146.1 BE |
| 3,593,307 | 7/1971 | Gouge | 340/172.5 |

*Primary Examiner*—Gareth D. Shaw
*Assistant Examiner*—Sydney R. Chirlin
*Attorney*—Donald M. Wight, Charles E. Brown et al.

[57] ABSTRACT

A triplicated data processing arrangement has majority decision elements between the different portions of each processor. The arrangement is provided with the facility that it can be divided into an independent processor and two remaining processors by the application of a control signal to the majority decision elements. The two remaining processors will still apply data signals to the majority decision elements in the normal manner while the independent processor is tested in isolation without affecting the operation of the remaining system.

6 Claims, 2 Drawing Figures

Figure 1:
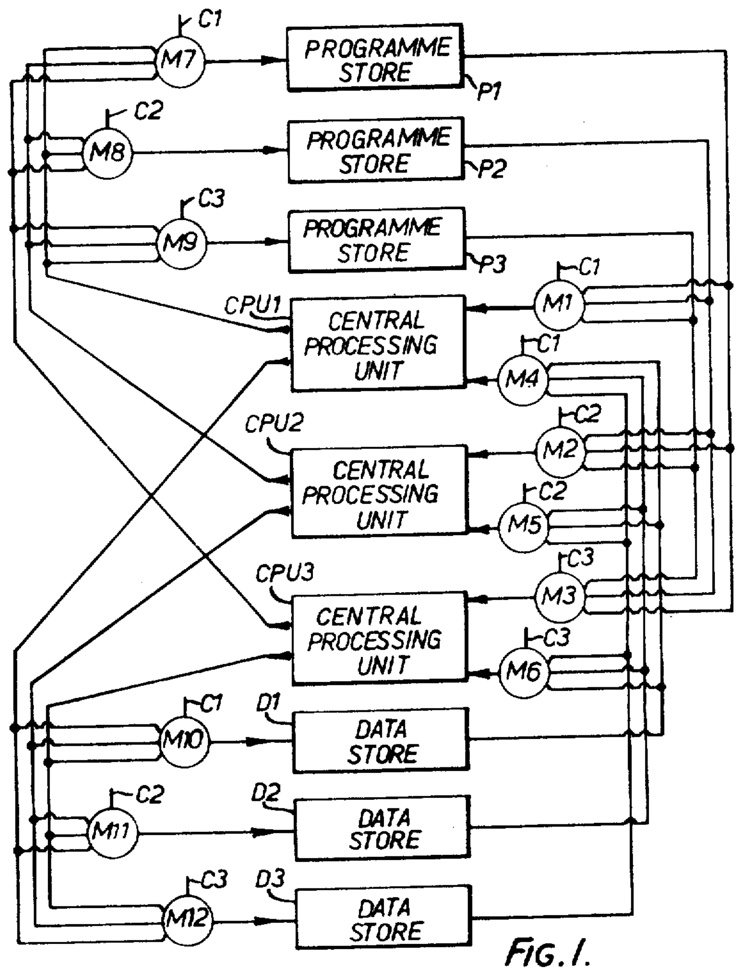

INVENTOR
Michael Harold John Yates
BY
Baldwin Wight & Brown
ATTORNEYS

DATA PROCESSING ARRANGEMENTS HAVING CONVERTIBLE MAJORITY DECISION VOTING

The present invention relates to data processing arrangements and more particularly to data processing arrangements in which, for security of operation, a plurality of processors is used and the output is obtained by taking a majority decision of the outputs of the plurality of processors.

A number of proposals have been put forward in which, to obtain secure operation, a plurality of processors, for example, three processors, is used each working independently of the others to perform the same processing functions and the results obtained from the processing being passed to a majority decision unit to provide a majority decided result as the output of the system. This arrangement provides very secure working since the likelihood of more than one processor being in error at a time is remote. However, if one of the processors fails, it has to be withdrawn from service to detect the cause of the failure and when this occurs its input to the majority decision unit must be inhibited so that processing arrangement output will then be provided by the two remaining processors provided that they agree. Disagreement of the outputs of the remaining two processors is effectively catastrophic and both results must be regarded as worthless and ignored.

In such an arrangement it is contemplated that each processor comprises its own units which act independently of the other processors. If, for example, it is considered that a processor comprises a programme store (which would normally be a "read only" system) and a data store for storing variable data and a central processing unit the processing unit acting upon programmes stored in the programme store to process information derived from and stored in the variable data store, it is possible that an error may occur in any of these three units but that if two independent processors are in error the error may be in one unit for one processor but in a unit of different type for the other processor. It has therefore been proposed that there should be a plurality of individual units and the inputs to each unit should be by way of majority decision circuits such that each programme store is coupled to each central processing unit via a majority decision circuit at each central processing unit. Similarly, each data store is coupled to the central processing unit, the central processing units are similarly connected to the programme stores to initiate the start of a new programme and the central processing units are similarly connected to the data stores to feed back data into those stores. In this arrangement if, for example, there are three programme stores, three data stores and three central processing units, provided there are two programme stores, two central processing units and two data stores which are correct then a satisfactory majority decided result can be obtained. In other words, there may be one programme store in error, one central processing unit in error and one data store in error and each of these may be from a different group of three units, i.e., from a different processor. Thus, in a situation where all three processors in the first mentioned situation would have been in error one still has an operable and secure processing arrangement. However, this arrangement suffers from the problem that it is unrealistic to say that any programme store belongs to any one processor since the programme store may operate with any of the three central processing units and any of the three data stores. If, therefore, faults occur, one has the problem that it is not possible to simply withdraw a processor from the operation as in the previous case so that although one has secured the result and also each stage in the generation of the result is secured since at every stage a majority decision was taken, one has the difficulty that to effect a repair and test a system the whole processing unit needs to be stopped and a test routine put into effect.

The present invention seeks to provide improved data processing arrangements in which this disadvantage is overcome.

According to this invention a data processing arrangement comprises a plurality of units (which may be programme stores, central processing units, data stores and the like as known per se) in which input signals arranged to be applied to a unit from others of said units are arranged to be so applied via majority decision gating circuits individual to that unit, each majority decision gating circuit being such that, at will, its function may be changed from a majority decision function to a simple gate function in which one of its input terminals is connected directly to its output terminal.

Preferably each of said majority decision gating circuits comprises $n$ NAND gates each having n input terminals, one of the input terminal of each of said $n$ NAND gates being arranged to have a control signal applied thereto and the other input terminals of each of said $n$ NAND gates being arranged to have applied thereto all of the input signals to be subjected to majority decision save a different one input signal in each case, the output terminal of all of said $n$ NAND gates being connected to respective ones of a further NAND gate having $n + 1$ input terminals, the remaining input terminal of said further NAND gate being connected to the output terminal of another NAND gate having two input terminals, one of said last mentioned two input terminals being connected to have applied thereto one of said input signals to be subjected to majority decision and the other of said last mentioned two input terminals being connected to have applied thereto said control signal relatively inverted, where n is the number of input signals to be subjected to majority decision.

Figure 2:
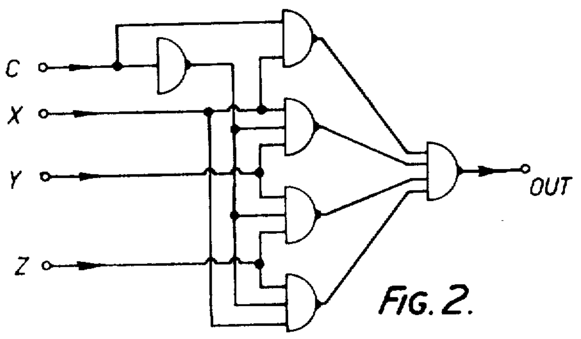

Reference will now be made by way of example to the accompanying drawings in which FIG. 1 shows diagrammatically a data processing arrangement according to the invention; and FIG. 2 shows diagrammatically a majority decision gating circuit for use in a data processing arrangement according to FIG. 1.

In FIG. 1 there is shown a data processing arrangement comprising three programme stores P1, P2 and P3, three central processing units CPU1, CPU2 and CPU3 and three data stores D1, D2 and D3. The output from each programme store P1, P2 and P3 is coupled to the programme input of each central processing unit through the majority decision gates M1, M2 and M3. Each data store output is connected to the data inputs of the central processing unit through majority decision gates M4, M5 and M6. The central processing unit address and control outputs for the programme store are each connected to each programme store through majority decision gates M7, M8 and M9 and the address and control outputs for the data stores from the central processing units are each connected to the data stores through majority decision gates M10, M11 and M12. The majority decision gates connected to the inputs to the central processing unit CPU1, the programme store P1 and the data store D1 all have a control input to which a signal C1 may be fed and the majority decision gates connected to the inputs to the central processing unit CPU2, the programme store P2 and the data store D2 all have control inputs to which a control C2 may be fed and similarly all the majority decision gates connected to the inputs of the central processing unit CPU3, the programme store P3 and the data store D3 having inputs to which a control signal C3 may be fed.

In normal operations the arrangement as shown in FIG. 1 operates as follows:

The programme stores are addressed by all the central processing units to initiate the next programme step in the processing arrangement and the addressing and control signals from the processing units are passed to the programme stores via the majority decision circuits M7, M8 and M9. By this means all the programme stores will receive in normal operation the same address and control signals and operate in accordance with the instructions contained in these signals. The outputs from the programme stores are all passed to the central processing units through majority decision gates M1, M2 and M3 such that the programme signals received by each central processing unit will be the same in normal operation. Similarly, the process and control information will be passed from the central processing unit to the data stores through gates M10, M11 and M12 such that all the data stores will receive the same process and control information and similarly the outputs from the data stores will be passed to the central processing units via the majority decision gates M4, M5 and M6 so that the central processing units will all receive the same data inputs. The processing arrangement is therefore secured at each stage. Each transference of information or control signal from one unit to another is done on a majority decided basis in normal operation and the outputs from three processors will be taken via a majority decision gate (not shown). This arrangement allows more secure operation and, as so far described, is similar to a prior proposal. However, alarm circuits (not shown) will operate in the event of faults being detected at the majority decision gates. If, as a result of an alarm signal it appears that there is an error in one of the units P1, CPU1 or D1 then a control signal will be applied to the C1 input and the majority decision gates coupled to this input are arranged such that they will no longer act to pass a majority decided result to their output but will pass solely that signal received from the corresponding unit with the suffix 1. This means that the programme store P1, the central processing unit CPU1 and the data store D1 are then coupled together to form an independent processor and this independent processor may then be tested as requires while the remaining units - programme stores P2 and P3, central processing units CPU2 and CPU3 and data stores D2 and D3 carry on operating as described previously. With this arrangement, therefore, one has the advantage of the second described prior known processing arrangement of excellent security and at the same time one has the facility of the first described arrangement whereby an individual processor may be tested while the remainder of the system operates independently.

The majority decision control gating circuits represented diagrammatically as simple gates in FIG. 1 are shown in more detail in FIG. 2. In this drawing inputs to the gates are shown as a control input C with three data inputs X, Y and Z and an output OUT. The gating circuit utilizes NAND type logic gates, for example of the Marconi-Elliott 9,000 series. These NAND gates have a truth table whereby if all "0's" appear at their inputs a "1" appears at the output, whereas if all "1's" appear at their respective inputs, "0's" appear at their outputs and if any gate has a mixture of "0's" and "1's" at its inputs a "1" appears at its output. One of the gates connected to the control input C has a single input and this gate acts as a straight-forward inverter gate. It will be seen, therefore, that if an "0" signal is applied to the control input C then at the output OUT there appears that signal output which corresponds to the signal appearing at the majority of the inputs X, Y and Z. If, however, a "1" signal is applied at the control input C then the signal at the output corresponds with the signal appearing at the input X and the inputs Y and Z are ignored. No fault detection or alarm outputs are shown in the drawing, for the sake, of clarity, but these would correspond to those normally employed in majority decision circuits.

To enable rapid updating of the data store of a processing unit which has been isolated for testing and correction purposes, upon re-connection a special programme could be employed which is arranged such that it initiates the feeding of each stored word to the central processing unit and thereafter immediately initiates re-storing of that word back in the data stores after passing through the processing unit. By virtue of the majority decision gates the reconnected data store D will be updated with correct information as fast as the processing unit can transfer the words from output to input.

I claim:

1. In a data processing arrangement, in combination:
- a processing unit;
- a plurality of data means for producing data signal outputs to be processed by said processing unit;
- a majority decision gating circuit having a plurality of inputs connected to the data signal outputs of said data means and an output connected to said processing unit for conveying a majority decision signal to the processing unit so as to secure against a minority dissenting vote; and
- control means connected to said majority decision gating circuit for selectively converting it to a simple gate in which its output signal is solely dependent upon a predetermined one of said data signal outputs.

2. In a data processing arrangement as defined in claim 1 wherein said majority decision gating circuit comprises a bank of NAND gates each receiving a different combination of the majority of said data signal outputs, and a further NAND gate receiving the outputs of said bank of NAND gates; and wherein said control means comprises an inverter having a control signal input and an output connected to all NAND gates of said bank, and a control NAND gate having said control signal input and an input from said one data signal output and having an output connected to said further NAND gate.

3. In a data processing arrangement, in combination:

three first units, three majority decision gating circuits, and three second units, each of said first units having an input connected to an output of a respective one of said majority decision gating circuits and each of said majority decision gating circuits receiving an input from each of said second units; and control means connected to at least one of said majority decision gating circuits for converting it to a simple gate in which its output is dependent solely upon the input from a predetermined one of said second units, whereby said one second unit and that first unit associated with said one majority decision gating circuit may be isolated for testing purposes while the remaining portion of the arrangement continues to operate the basis of majority decision.

4. In a data processing arrangement as defined in claim 3 wherein each majority decision gating circuit comprises three NAND gates each having a pair of inputs from a different combination of outputs from said second units, and a further NAND gate having inputs from said three NAND gates; and wherein said control means comprises an inverter having a control signal and an output connected to each of said three NAND gates, and a control NAND gate having said control signal input and an input from said one second unit, and having an output connected to said further NAND gate.

5. In a data processing system, the combination of:

at least three data processing loops, each loop comprising a plurality of components and each component having input means and output means;

majority voting circuit means providing the input means for each of said components and the output means of like components of all the loops being connected to the majority voting circuit means of like other components of all of the loops whereby normally to operate the system on the basis of majority voting indiscriminately within the totality of components of the system;

control means for isolating each loop to function independently of the remaining portion of the system while such remaining portion of the system continues to operate on the basis of majority voting, said control means comprising plural control signal means, one for each loop, and each connected to all the majority voting circuit means belonging to its associated loop for selectively passing only those output signals belonging to the components of said associated loop, whereby an isolated loop may be tested independently and without disturbing the remaining portion of the system.

6. In a data processing system as defined in claim 5 wherein each loop comprises three components, a central processing unit, a data store and a program store; the output means of all central processing units being connected to all majority voting circuit means belonging to all of said data stores and all of said program stores; each central processing unit having two majority voting circuit means associated therewith; the output means of all said data stores being connected to one majority voting circuit means of each control processing unit; and the output means of all said program stores being connected to the other majority voting circuit means of each central processing unit.

* * * * *